(12) United States Patent
Abel et al.

(10) Patent No.: US 10,563,922 B2
(45) Date of Patent: Feb. 18, 2020

(54) METHOD AND DEVICE FOR DETECTING A LEAKAGE IN THE AREA OF AT LEAST ONE COOLING DEVICE OF A FURNACE AND A FURNACE

(71) Applicant: PRIMETALS TECHNOLOGIES AUSTRIA GMBH, Linz (AT)

(72) Inventors: Markus Abel, Kehl-Bodersweier (DE); Markus Dorndorf, Baden-Baden (DE); Mark Tratnig, St. Margareten i.R. (AT); Denis A. Vaillancourt, Canonsburg, PA (US)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 954 days.

(21) Appl. No.: 14/415,859

(22) PCT Filed: Jun. 12, 2013

(86) PCT No.: PCT/EP2013/062146
§ 371 (c)(1),
(2) Date: Jan. 20, 2015

(87) PCT Pub. No.: WO2014/019753
PCT Pub. Date: Feb. 6, 2014

(65) Prior Publication Data
US 2015/0184943 A1    Jul. 2, 2015

(30) Foreign Application Priority Data
Aug. 1, 2012    (EP) ..................... 12178854

(51) Int. Cl.
*F27D 21/00* (2006.01)
*F27D 11/08* (2006.01)
*G01M 3/02* (2006.01)

(52) U.S. Cl.
CPC .............. *F27D 21/00* (2013.01); *F27D 11/08* (2013.01); *G01M 3/02* (2013.01); *F27D 2021/0071* (2013.01)

(58) Field of Classification Search
CPC .... C21C 2005/5288; F27B 3/24; F27D 11/08; F27D 19/00; F27D 1/12;
(Continued)

(56) References Cited

U.S. PATENT DOCUMENTS 4,065,634 A * 12/1977 Beizerov ................. F27B 3/085
266/275
4,105,438 A * 8/1978 Sherwood ............... C21C 5/567
266/208
(Continued)

FOREIGN PATENT DOCUMENTS

DE     1918475 A1    2/1971
DE     30 48 025      7/1982
(Continued)

OTHER PUBLICATIONS

Translation of JP61143508 (Year: 2019).*
(Continued)

*Primary Examiner* — Ibrahime A Abraham
*Assistant Examiner* — Frederick F Calvetti
(74) *Attorney, Agent, or Firm* — Ostrolenk Faber LLP

(57) ABSTRACT

A method for detecting a leakage in the area of at least one cooling device of a furnace, wherein, in the event of a leakage, liquid coolant gets into a furnace chamber of the furnace from the at least one cooling device, and wherein a stream of exhaust gas is continuously removed from the furnace chamber over a period of time Z. The steps include dividing off a representative partial stream from the stream of exhaust gas during the period of time Z; condensing vaporous constituents contained in the partial stream; deter-
(Continued)

mining a stream of condensate obtained; comparing the stream of condensate obtained with a condensate-stream limit value; and indicating a leakage if the stream of condensate exceeds the condensate-stream limit value. Also a device for carrying out the method and a furnace with such a device are disclosed.

6 Claims, 3 Drawing Sheets

(58) Field of Classification Search
CPC ..... F27D 2019/0015; F27D 2021/0071; F27D 2021/0078; F27D 21/00; F27D 21/04; G01M 3/02; Y02P 10/216
See application file for complete search history.

(56) References Cited

U.S. PATENT DOCUMENTS

| | | | | |
|---|---|---|---|---|
| 4,197,900 A | * | 4/1980 | Bloshenko | C22B 9/20 164/147.1 |
| 4,304,396 A | | 12/1981 | Udoh | |
| 4,456,476 A | * | 6/1984 | Sherwood | C21B 13/085 75/433 |
| 4,603,426 A | * | 7/1986 | Sauer | G11C 19/285 257/216 |
| 4,615,511 A | * | 10/1986 | Sherwood | C21B 13/085 266/208 |
| 5,344,122 A | * | 9/1994 | Vuillermoz | C21C 5/5217 266/79 |
| 5,933,445 A | * | 8/1999 | Pavlicevic | C21C 5/5229 373/74 |
| 6,652,802 B2 | * | 11/2003 | Sherwood | C21B 13/085 266/173 |
| 7,223,978 B2 | * | 5/2007 | Vuillermoz | G01N 21/359 250/343 |
| 2010/0145523 A1 | * | 6/2010 | Rubin | C22B 9/22 700/271 |
| 2013/0206358 A1 | * | 8/2013 | Maddalena | C21B 7/10 165/11.1 |
| 2015/0184943 A1 | * | 7/2015 | Abel | F27B 3/24 373/8 |

FOREIGN PATENT DOCUMENTS

| | | | |
|---|---|---|---|
| DE | 10 2004 058 520 | | 4/2006 |
| JP | 61143508 | * | 7/1986 |
| JP | S61143508 A | | 7/1986 |
| SU | 350828 A1 | | 9/1972 |
| SU | 789586 A1 | | 12/1980 |
| SU | 992590 A1 | | 1/1983 |

OTHER PUBLICATIONS

Office Action with Search Report dated Apr. 19, 2017 in corresponding Russian Patent Application No. 2015105818/02(009321) (total 10 pages).
International Search Report dated Oct. 10, 2013 issued in corresponding International patent application No. PCT/EP2013/062146.
Written Opinion dated Oct. 10, 2013 issued in corresponding International patent application No. PCT/EP2013/062146.
European Search Report dated Jan. 7, 2013 issued in corresponding European Application No. 12178854.1.

* cited by examiner

METHOD AND DEVICE FOR DETECTING A LEAKAGE IN THE AREA OF AT LEAST ONE COOLING DEVICE OF A FURNACE AND A FURNACE

CROSS-REFERENCE TO RELATED APPLICATIONS

The present application is a 35 U.S.C. §§ 371 national phase conversion of PCT/EP2013/062146, filed Jun. 12, 2013, which claims priority of European Patent Application No. 12178854.1, filed Aug. 1, 2012, the contents of which are incorporated by reference herein. The PCT International Application was published in the German language.

TECHNICAL FIELD

The invention relates to a method for detecting a leakage in the area of at least one cooling device of a furnace, in particular an electric arc furnace, wherein in the event of a leakage, coolant from the at least one cooling device enters a furnace chamber of the furnace and wherein a stream of exhaust gas is removed from the furnace chamber over a period of time Z. The invention also relates to a device for carrying out the method and a furnace with a device of this kind.

TECHNICAL BACKGROUND

To protect the fireproof lining of a furnace from excessive thermal stress, cooling is frequently provided for the wall of the furnace. In the case of electric arc furnaces, so-called cooling panels are incorporated in the furnace wall. Liquid coolant flows through the cooling panels, frequently in the form of water.

DE 30 48 025 A1 describes a cooling device of this kind for an electric arc furnace. The cooling devices are arranged in contact with the furnace chamber. As a result, they are themselves exposed to high mechanical and thermal stresses. For example, the area of the cooling device is repeatedly subject to cracking or leakages resulting in the ingress of liquid coolant into the hot furnace chamber. A coolant ingress of this kind into the hot furnace chamber is hazardous since the coolant evaporates abruptly. Depending upon the size of the leakage, an actual explosion may occur which can cause serious damage to the furnace and also endanger the life of the furnace operator.

It has been found that leakages in cooling devices are initially generally small and relatively little coolant enters the furnace chamber. However, due to the high mechanical and thermal stress on the cooling device, the fine cracks that form and through which the coolant can escape, rapidly enlarge.

Therefore, the earlier a leakage in the area of the cooling device of a furnace is detected, the sooner it is possible to counteract an impending explosion and prevent damage to the furnace and risk to the life and body of the operator. Existing systems for the early detection of leakages in cooling devices of furnaces do not meet the requirements relevant to safety issues since the accuracy and unambiguousness of existing measuring methods is not sufficient.

For example, attempts have already been made to obtain information on leakages by taking differential measurements of coolant pressure on different cooling devices of a furnace. A leakage results in loss of coolant in a cooling device and hence to a loss of pressure in the cooling device affected. However, due to the generally high quantities of coolant in each cooling device and the usually widely branched supply and discharge system, this method has been found to be too slow and imprecise for the detection of leakages.

When water is used as a coolant, which is frequently the case, there are also already measuring systems in use which detect the hydrogen content in the stream of exhaust gas of the furnace and use this value to determine the amount of water contained in the exhaust gas by inverse calculation. Since water entering the furnace chamber does not always decompose into hydrogen and oxygen, but water vapor can be contained in the stream of exhaust gas, and in addition combustion processes normally take place which entail the formation of carbon dioxide and water and wherein the water dissociates with the formation of hydrogen, once again, this method is not informative enough for reliable detection of leakages.

U.S. Pat. No. 7,223,978 B2 describes a general method for determining the amount of chemical components in a hot gas, in particular in an electric arc furnace, wherein the determination of the carbon dioxide, carbon monoxide, oxygen or water content is performed by means of a laser diode.

SUMMARY OF THE INVENTION

It is the object of the invention to provide a reliable method for detecting leakage in the area in at least one cooling device of a furnace and to a device for carrying out a method of this kind. It also relates to provision of a furnace with a device of this kind.

The object of the method is achieved in the event of a leakage, of liquid, in particular aqueous coolant, from the at least one cooling device enters a furnace chamber of the furnace and wherein a stream of exhaust gas is removed from the furnace chamber over a period of time Z, using the following steps:
  dividing off a representative partial stream from the stream of exhaust gas during the period of time Z;
  condensing vaporous constituents contained in the partial stream and determining controls a stream of condensate obtained;
  comparing the stream of condensate obtained with a condensate-stream limit value and
  indicating a leakage, if the stream of condensate exceeds the condensate-stream limit value.

It has been found that, when a leakage occurs in the area of one or more cooling devices, the stream of condensate increases noticeably and can be compared with a condensate-stream limit value determined in advance on the basis of normal operation of the furnace with no leakage. If the stream of condensate exceeds the condensate-stream limit value, it is concluded that there is a leakage so that corresponding countermeasures can be initiated. In this case, it is possible to throttle the coolant feed to one or more cooling devices, to shut down the furnace and to repair or replace the damaged cooling device(s). It is possible for the operator to be evacuated out of the danger zone around the furnace for as long as an acute explosion risk exists. The method is very suitable for the reliable detection of leakages in cooling devices.

One example of a measuring method for determining the amount of condensate that occurs during the period of time Z is a flow rate measurement that determines a volumetric or mass flow rate of condensate. Here, it is particularly preferable to use flow-rate sensors in the form of ultrasonic flow-rate meters, hydrometric vanes, oval-wheel meters, etc. A heat-activated mass flow-rate meter that measures the temperature, with which a changing mass flow rate is calculated from a changing media temperature has also been found to be suitable.

The period of time Z in which the stream of exhaust gas is removed from the furnace chamber can include a heating-up phase until a furnace operating temperature is achieved, a holding phase at the furnace operating temperature and a cooling-down phase. During the period of time Z, it is possible to perform a continuous flow measurement or also a discontinuous flow measurement. In the case of an electric arc furnace, the stream of condensate is preferably determined during the process time in which the electrodes are supplied with power (so-called "Power-ON" time) and/or in the down-times (so-called "Power-OFF" time), in which no power is supplied to the electrodes.

However, with a discontinuous measuring method, the measuring frequency must be sufficient to ensure that a rapidly increasing leak is not overlooked. Therefore, with regard to the safety aspect, continuous measurement of the stream of condensate is particularly preferable.

It has been found that the accuracy of the method can be further increased if the condensate-stream limit values are permanently corrected on the basis of current data on the furnace operation. For example, inter alia the current atmospheric moisture and the volume stream of fuel burned in the furnace, where this is present in the form of hydrogen and/or hydrocarbon(s), influence the amount of condensate formed.

For example, it has been found to be advantageous for the condensate-stream limit value to be selected in dependence on an atmospheric moisture and/or a volumetric flow rate of fuel burned in the furnace in the form of hydrogen and/or hydrocarbon(s).

If the furnace is an electric arc furnace and at least one electrode is guided into the furnace chamber, wherein a liquid, in particular an aqueous cooling medium, is applied to the surface thereof for cooling, the amount of cooling medium supplied also affects the amount of condensate formed. Here, it has been found to be advantageous for the condensate-stream limit value to be selected in dependence on a cooling medium feed stream of liquid cooling medium supplied for cooling the at least one electrode in the period of time Z.

Here, an aqueous medium, in particular water, is preferably used as the coolant and/or cooling medium. It is possible to mix chemical substances into the water chemical substances, which, for example, prevent or inhibit algal formation, bacterial contamination, sludge sedimentation or the crystallization of sparingly soluble salts or reduce surface tension of the water etc. However, in principle, the method according to the invention can be used with any evaporating and condensing coolant that causes damage to the furnace or endangers the operator if it penetrates the furnace chamber.

It has also been found that moisture of the material to be treated in the furnace chamber influences the amount of condensate formed. If, for example, scrap that had previously been exposed to weathering or rain is introduced into an electric arc furnace, the additional water vapor formed during the heating of the scrap should be taken into account when calculating the condensate-stream limit values.

Consequently, it is been found advantageous for the condensate-stream limit value to be selected in dependence on moisture of a material to be treated in the furnace chamber in the period of time Z.

A detected leakage in the cooling device is preferably indicated via an acoustic and/or optical warning signal. This enables the operator to be informed and warned quickly and for immediate countermeasures for the elimination of the leakage to be initiated.

The object is achieved for the device for carrying out a method according to the invention in that the device comprises:

at least one condensing mechanism for condensing vaporous constituents contained in the partial stream;

at least one measuring mechanism for determining the stream of condensate obtained;

at least one arithmetic logic unit for comparing the stream of condensate obtained with a condensate-stream limit value and at least one display unit for indicating a leakage, as soon as the stream of condensate exceeds the condensate-stream limit value.

The device according to the invention is simple, inexpensive and meets the requirements for reliability and accuracy of the measurements.

The condensing mechanism used is in particular a gas cooler to cool the temperature of the partial stream until the vaporous constituents contained therein, possibly comprising a coolant and possibly another cooling medium, are condensed.

It has been found advantageous inter alia to use the aforementioned flow-rate sensors as the measuring mechanism for the determination of the stream of condensate obtained.

To measure the atmospheric moisture, the device also preferably comprises at least one first mechanism, which is connected to the at least one arithmetic logic unit by a data link.

To detect the volumetric flow rate of fuel (in the form of hydrogen and/or hydrocarbon(s)) supplied to the furnace for combustion, the device preferably also comprises at least one second mechanism, which is connected to the at least one arithmetic logic unit by a data link.

To detect the moisture of the material to be treated in the furnace chamber in the period of time Z, the device preferably also comprises at least one third mechanism, which is connected to the at least one arithmetic logic unit by a data link.

To detect a cooling medium feed stream of liquid cooling medium for cooling the at least one electrode in the period of time Z, the device preferably also comprises at least one fourth mechanism, which is connected to the at least one arithmetic logic unit by a data link.

A "data-link" connection to the at least one arithmetic logic unit should be understood to be the presence of a wire-bound or wireless data line between the respective mechanism and the arithmetic logic unit.

A coolant volumetric flow rate flowing through the at least one cooling device is also optionally acquired and taken into account. If, following an increase or decrease of the coolant volumetric flow rate, an increase or decrease of the stream of condensate is also measured, the change established in the stream of condensate can be used as here as the basis for drawing direct conclusions regarding the size of a leakage present.

In the arithmetic logic unit, the condensate-stream limit value is corrected on the basis of the values acquired for the atmospheric moisture and/or the volumetric flow rate of the fuel supplied to the furnace and/or the moisture of the material to be treated in the furnace chamber and/or the amount of the cooling medium supplied to an electrode. An online correction of the condensate-stream limit values of this kind enables high-precise detection of the occurrence of a leakage with an extremely short response time.

To this end, a standard value for the condensate-stream limit value KSG is stored in the arithmetic logic unit, which is corrected in particular on the basis of measured values for the fuel volumetric flow rate burned in the furnace chamber and/or the ambient moisture and/or the moisture of the material to be treated in the furnace chamber and/or other cooling media to be introduced into the furnace chamber, for example for cooling the surface of electrodes.

This is then used to calculate a currently expected long-time average value of the stream of condensate KS to be expected and the standard deviation thereof which is used as the basis for the determination of the current condensate-stream limit value. The measured stream of condensate KS is subjected to averaging in order to form a short-time average value. The short-time average value of the measured stream of condensate KS is now compared with the current condensate-stream limit value. The coolant volumetric flow rate flowing through the at least one cooling device is also optionally detected and taken into account. If the short-time average value exceeds the current condensate-stream limit values, it will be concluded that there is a leakage in the area of the at least one cooling device and corresponding countermeasures initiated and a warning signal output.

At the end of a furnace campaign, for example of a melt-down cycle in which no leakage occurred, the standard value for the condensate-stream limit value is corrected on the basis of the condensate-stream limit values determined over the last furnace campaigns and stored again in the arithmetic logic unit.

The object is achieved for the furnace in that it comprises at a furnace chamber, at least one cooling device arranged in contact with the furnace chamber, at least one exhaust gas removal line for removing a stream of exhaust gas from the furnace chamber, at least one partial stream removal line branching off from the exhaust gas removal line and at least one device according to the invention, wherein the at least one condensing mechanism thereof is connected to the partial stream removal line.

Due to the rapid and reliable possibility for detecting the occurrence of a leakage in a cooling device, a furnace of this kind can be operated particularly safely.

The furnace is in particular an electric arc furnace.

The furnace in particular comprises a furnace vessel and a furnace cover, which form the furnace chamber, and at least one electrode that can be introduced into the furnace chamber. This is usually guided through the furnace cover in the furnace chamber. In this case, cooling devices that can be subject to leakages are usually located in the furnace wall or on the inner side of the furnace cover in contact with the furnace chamber.

In the partial stream removal line, at least one conventional and independent exhaust gas analyzer for determining the composition of the exhaust gas, for example with respect to carbon dioxide, carbon monoxide, hydrogen, oxygen etc., can be arranged before the at least one condensing mechanism. An exhaust gas analyzer can alternatively also be inserted between the partial stream removal line and the at least one condensing mechanism, wherein the complete partial stream flows through the exhaust gas analyzer and is only subsequently supplied to the at least one condensing mechanism.

In a preferred embodiment of the furnace, the furnace comprises at least one cooling-medium application arrangement for each electrode to apply liquid cooling medium to a surface of the electrode. In this case, at least one control valve is provided the setting of which regulates the amount of coolant supplied and which in particular simultaneously forms a fourth mechanism of the device.

The method according to the invention and the device according to the invention can be used for all types of furnaces with which unwanted ingress of coolant into the hot furnace chamber is possible.

BRIEF DESCRIPTION OF THE DRAWINGS

FIGS. 1 to 3 are to explain exemplary solutions according to the invention, in which:

FIG. 1 shows a furnace with a first device according to the invention;

FIG. 2 shows a furnace with a second device according to the invention; and

FIG. 3 shows a furnace with a second device according to the invention and an exhaust gas analyzer.

DESCRIPTION OF EMBODIMENTS

Figure 1:
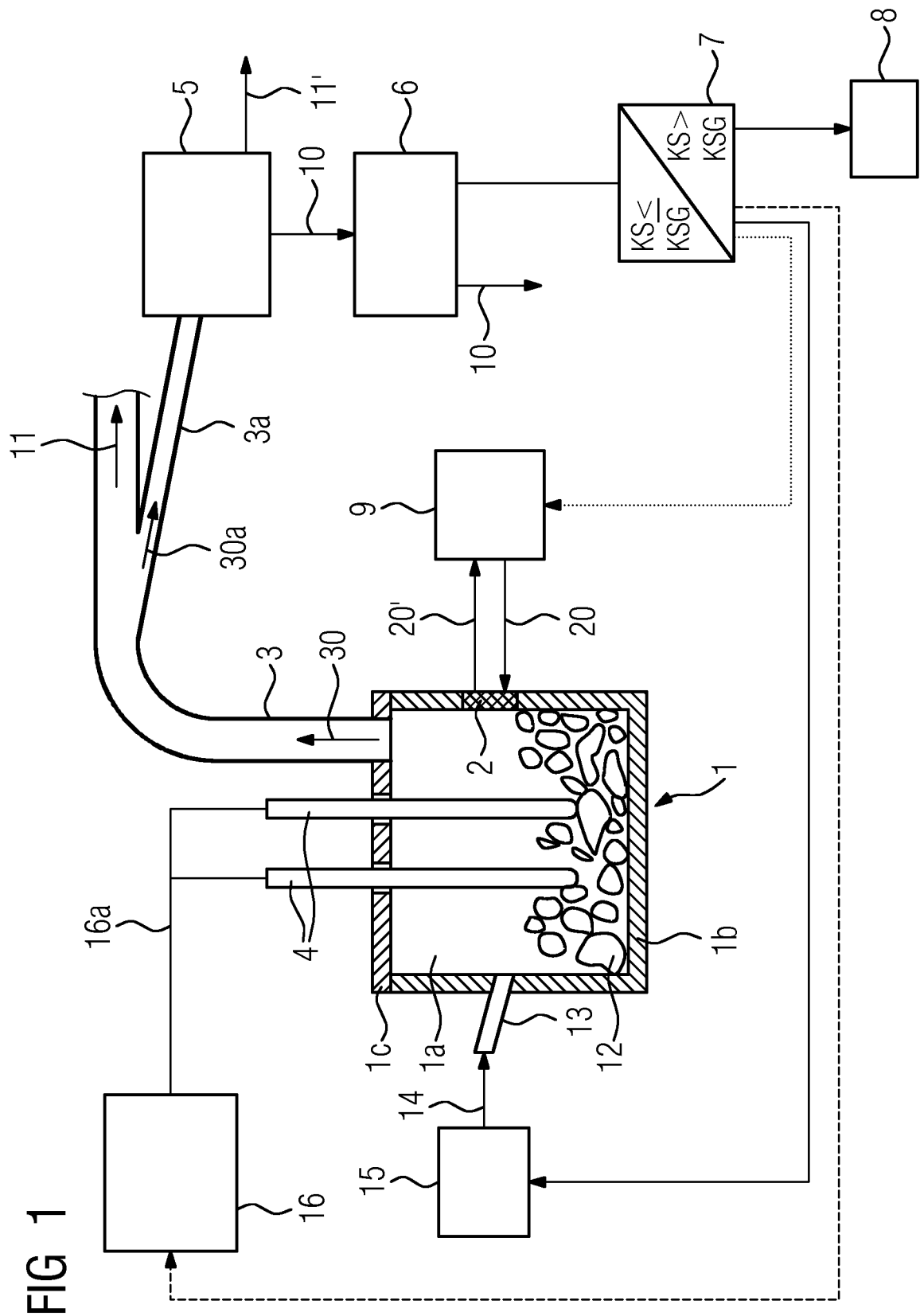

FIG. 1 shows a furnace 1 with a first device according to the invention. Here, the furnace 1 is an electric arc furnace for melting a material 12 in the form of metal scrap. It comprises a furnace vessel 1b and a furnace cover 1c, which together form a furnace chamber 1a, a cooling device 2 in a wall of the furnace vessel 1b, which is arranged in contact with the furnace chamber 1a, an exhaust gas removal line 3 for removing a stream of exhaust gas 30 from the furnace chamber 1a, a partial stream removal line 3a branching off from the exhaust gas removal line 3 and electrodes 4 that can be introduced into the furnace chamber 1a. A burner unit 13 is guided through the wall of the furnace vessel 1b and is supplied with fuel 14, here in the form of natural gas, via a fuel supply unit 15. The fuel 14 is burned in the burner unit 13 under the supply of air or oxygen (which is not shown for purposes of clarity). The electrodes 4 are connected via power supply leads 16a to a power supply unit 16. A coolant supply unit 9 supplies the cooling device 2 with liquid coolant 20 in the form of water, which is guided through the cooling device 2 for the cooling thereof and discharged again in warmed-up state as heated coolant 20'.

The first device comprises a condensing mechanism 5 for condensing vaporous constituents contained in the partial stream 30a, a measuring mechanism 6 for determining the stream of condensate obtained 10, an arithmetic logic unit 7 for comparing the stream of condensate obtained (KS) 10 with a condensate-stream limit value (KSG) and a display unit 8 for indicating a leakage as soon as the stream of condensate 10 exceeds the condensate-stream limit value.

The condensing mechanism 5 is connected to the partial stream removal line 3a so that the partial stream 30a is guided into the condensing mechanism 5. The stream of residual exhaust gas 11 and a partial residual gas stream 11' remaining following condensation of the vaporous constituents in the condensing mechanism 5 can optionally be recombined.

With the method for detecting a leakage in the area of the cooling device 2 of the furnace 1, wherein in the event of a leakage liquid coolant 20 from the cooling device 2 enters the furnace chamber 1a of the furnace 1 and wherein a stream of exhaust gas 30 is removed continuously from the furnace chamber 1a over a period of time Z, the following steps are performed:

The representative partial stream 30a is divided off from the stream of exhaust gas 30 continuously or discontinuously over the period of time Z. The partial stream 30a is supplied to the condensing mechanism 5. Now, vaporous constituents contained in the partial stream 30*a* are condensed and the stream of condensate obtained 10 determined (i.e. condensate volume per time unit). When the result has been sent to the arithmetic logic unit 7, the value obtained for the stream of condensate (KS) 10 is compared there with a condensate-stream limit value (KSG). If the value for the stream of condensate (KS) 10 is below the condensate-stream limit value (KSG), i.e. KS>KSG, it is assumed that there is no leakage in the cooling device 2 and the melting process can be continued unchanged.

If the value for the stream of condensate (KS) 10 is above the condensate-stream limit value (KSG), i.e. KS>KSG, it is assumed that there is a leakage in the cooling device 2 and the signal is sent to the display unit 8, which emits an optical and/or acoustic warning signal to indicate the leakage. The operator of the furnace 1 can now initiate countermeasures to prevent the further ingress of coolant 20 into the furnace chamber 1*a* or reduce risk of an explosion. Alternatively, this can take place automatically via the arithmetic logic unit 7.

As a countermeasure, the arithmetic logic unit 7 can optionally reduce the amount of coolant 20 supplied to the cooling device 2 (see dotted line) and/or reduce the amount of electricity supplied to the electrodes 4 via the power supply unit 16 (see dashed line) and/or reduce the amount of fuel 14 supplied to the burner unit 13 and/or reduce the amount of cooling medium 21 sent to the electrodes 4. As a rule, the countermeasure(s) have to be initiated immediately in order to prevent an enlargement of the leakage with an increased risk of explosion.

Figure 2:
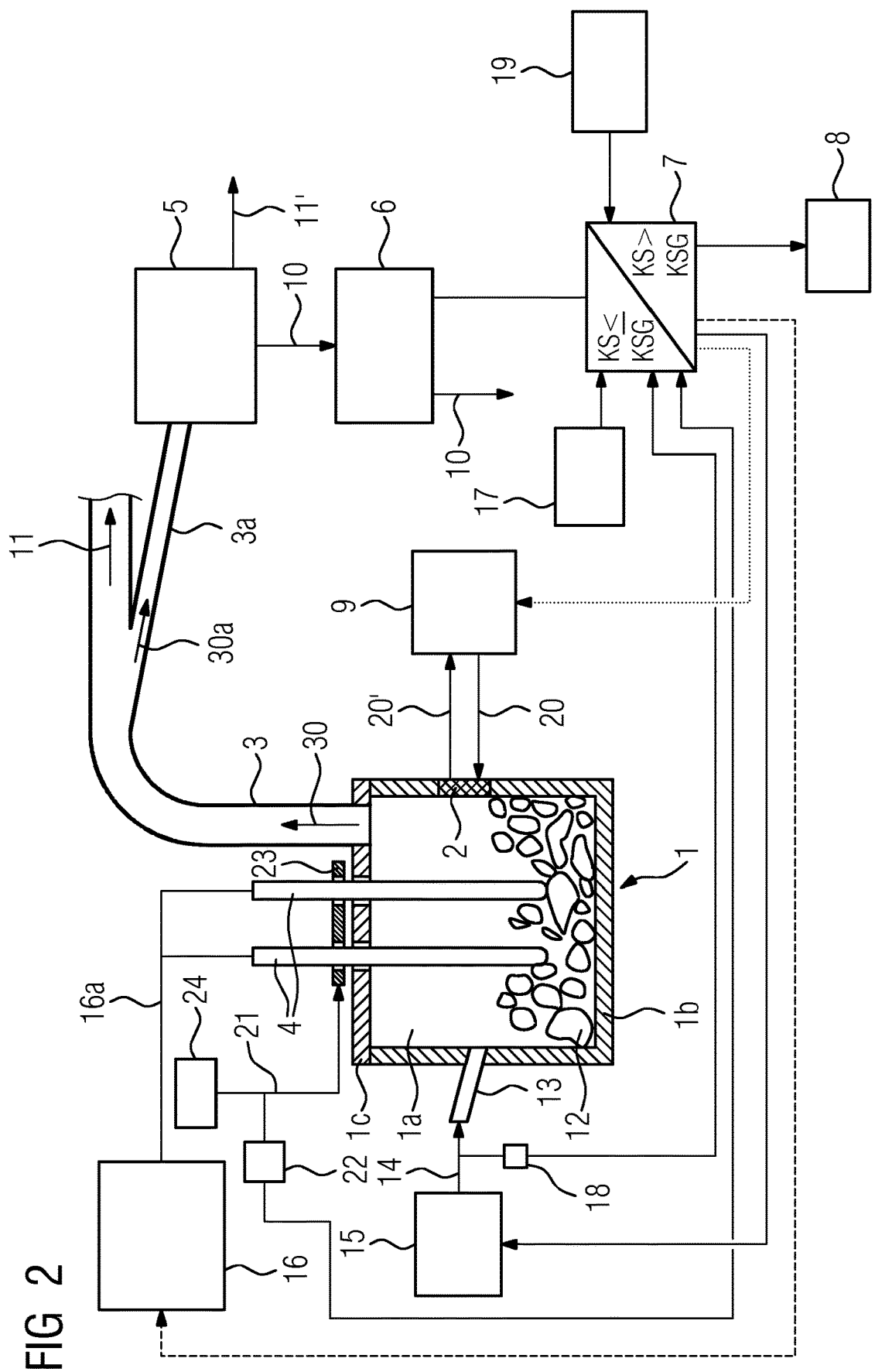

FIG. 2 shows the furnace 1 with a second device according to the invention. The same reference numbers as in FIG. 1 designate the same elements. Here, a liquid cooling medium 21 in the form of water is applied to the surface of the electrodes 4 for cooling, said cooling medium being supplied to the electrodes 4 by a cooling-medium supply unit 24 and applied to the surface thereof via a cooling-medium application arrangement 23, for example sprayed on all sides.

In addition to the constituents of the first device shown in FIG. 1, the second device shown here comprises the following further optional elements:
- a first mechanism 17 for measuring the atmospheric moisture, which is connected to the at least one arithmetic logic unit 7 by a data link;
- a second mechanism 18 for detecting the volumetric flow rate of fuel 14 supplied to the furnace 1 for combustion, which is connected to the at least one arithmetic logic unit 7 by a data link;
- a third mechanism 19 for detecting the moisture of the material 12 to be treated in the period of time Z in the furnace chamber 1*a*, which is connected to the at least one arithmetic logic unit 7 by a data link with; and
- a fourth mechanism 22 for detecting a cooling medium feed stream of liquid cooling medium 21 for cooling the electrodes 4, which is connected to the at least one arithmetic logic unit 7 by a data link.

The moisture of the material 12 to be treated is, for example, detected via a moisture sensor installed in the area of a storage area for the material 12, for example in a scrap yard or in a scrap trough.

The optional measured values for the atmospheric moisture and/or the volumetric flow rate of fuel 14 and/or the moisture of the material 12 to be treated and/or the cooling medium feed stream onto the electrodes 4 are sent to the arithmetic logic unit 7 and, on this basis, the condensate-stream limit value is permanently and automatically corrected.

Consequently, the condensate-stream limit value KSG is selected in dependence on an atmospheric moisture and/or a volumetric flow rate of fuel 14 burned in the furnace 1, in the form of hydrogen and/or hydrocarbon(s) and/or a cooling medium feed stream of liquid cooling medium 21 supplied for cooling the electrodes 4 in the period of time Z and/or a moisture of material 12 to be treated in the furnace chamber 1*a* in the period of time Z. In this way, a leakage in the cooling device 2 can be determined quickly and reliably since the main causes of water vapor in the stream of exhaust gas during normal operation of the furnace are monitored and hence it is possible to quantify their influence on the content of water vapor in the exhaust gas.

Hence, excess water vapor in the stream of exhaust gas resulting in the condensate-stream limit values KSG being exceeded can be reliably attributed to a leakage in a cooling device.

In the case of an optional detection (not shown here) of the coolant volumetric flow rate by the cooling device 2 and its transmission to the arithmetic logic unit 7, it is possible to use a change in the coolant volumetric flow rate to draw immediate conclusions regarding the change in the measured stream of condensate KS and hence the size of the leakage. Hence, it is possible to make a selective change to the coolant volumetric flow rate in the case of the suspected presence of a leakage in order to determine the actual size of the leakage.

Figure 3:
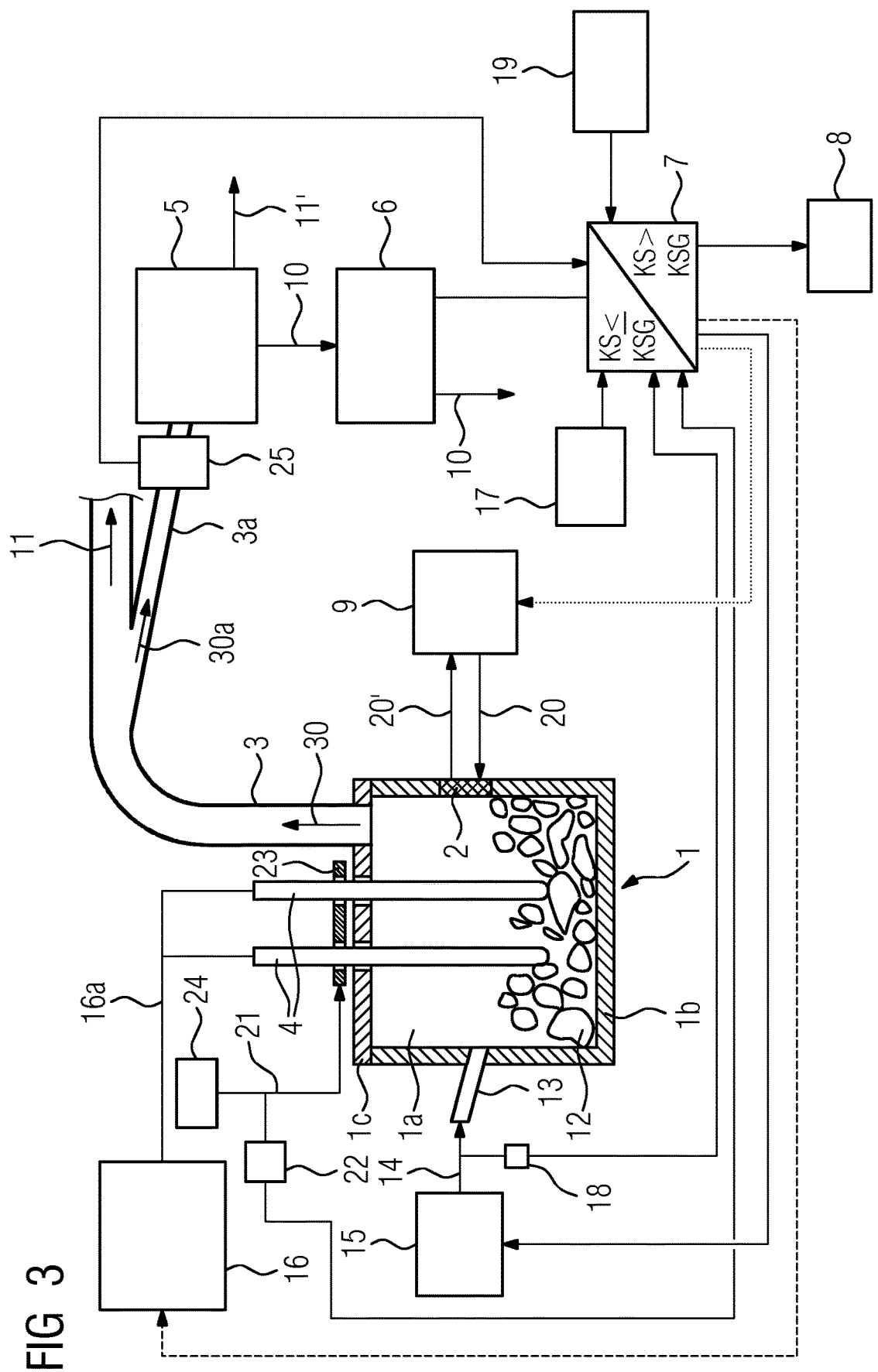

FIG. 3 shows the furnace 1 with a second device according to the invention according to FIG. 2 and an additional exhaust gas analyzer 25. The same reference numbers as in FIG. 2 designate the same elements. The exhaust gas analyzer 25 is arranged between the partial stream removal line 3*a* and the condensing mechanism 5 and is used, for example, to determine the carbon dioxide content, the carbon monoxide content, the hydrogen content, the oxygen content, nitrogen oxide content etc. of the partial stream 30*a* of the stream of exhaust gas 30. For example, with knowledge of the hydrogen content of the partial stream 30*a* and hence of the stream of exhaust gas 30, it is in particular possible for an additional correction to be made to the condensate-stream limit values KSG, since the amount of hydrogen present converted into the amount of water that would theoretically result therefrom has to be added to the water vapor present in the stream of exhaust gas.

This results in very quick and reliable method for detecting a leakage in the area of one or more cooling devices of a furnace.

The furnaces, devices and methods shown in FIGS. 1 to 3 are only examples. Therefore, the device according to the invention can also be used with types of furnaces other than the electric arc furnaces shown here with which cooling devices are arranged in direct contact with the furnace chamber.

The invention claimed is:

1. A method for detecting a coolant leakage in an area of at least one cooling device of a furnace, said at least one cooling device containing a liquid coolant, the method comprising:
   introducing liquid coolant from a furnace cooling device into a furnace chamber of the furnace;
   continuously removing a stream of exhaust gas from the furnace chamber over a period of time Z, the removal comprising the following steps:

dividing off a partial exhaust gas stream from the stream of exhaust gas during a period of time Z;

condensing vaporous constituents contained in the partial exhaust gas stream and determining a stream of condensate thus obtained;

comparing the stream of condensate obtained with a condensate-stream limit value and indicating a coolant leakage from the furnace cooling device into a furnace chamber of the furnace if the stream of condensate exceeds the condensate-stream limit value.

2. The method as claimed in claim 1, further comprising selecting the condensate-stream limit value dependent on at least one value selected from the group consisting of atmospheric moisture and a volumetric flow rate of fuel burned in the furnace.

3. The method as claimed in claim 1, wherein the furnace is an electric arc furnace and the method further comprises;

guiding at least one electrode of the furnace into the furnace chamber;

applying the liquid coolant to the surface of the electrode for cooling the electrode, and selecting the condensate-stream limit value depending on a cooling medium feed stream of the liquid coolant supplied for cooling the at least one electrode in the period of time Z.

4. The method as claimed in claim 3, further comprising:

supplying the liquid coolant to a wall of the chamber for cooling the wall; and forming at least one of the liquid coolant for the wall and the cooling medium for the at least one electrode from water.

5. The method as claimed in claim 1, further comprising selecting the condensate-stream limit value depending on an amount of moisture in a material to be treated in the furnace chamber in the period of time Z.

6. The method as claimed in claim 1, further comprising indicating the leakage in the at least one cooling device via an acoustic and/or optical warning signal.

\* \* \* \* \*